United States Patent [19]

Hergenrother et al.

[11] 4,182,835

[45] Jan. 8, 1980

[54] POLYPHOSPHAZENE COPOLYMERS CONTAINING NITROALKYL SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 941,109

[22] Filed: Sep. 8, 1978

[51] Int. Cl.² .................... C08G 79/02; C08G 85/00
[52] U.S. Cl. ............................. 528/168; 528/374; 528/399
[58] Field of Search .................. 528/399, 168, 374

[56] References Cited

U.S. PATENT DOCUMENTS 4,107,108  8/1978  Dieck et al. ............... 521/85

FOREIGN PATENT DOCUMENTS 2712542  9/1977  Fed. Rep. of Germany ........... 528/399

Primary Examiner—Wilbert J. Briggs, Sr.

[57] ABSTRACT

Polyphosphazene copolymers are prepared which contain randomly distributed units represented by the formulas:

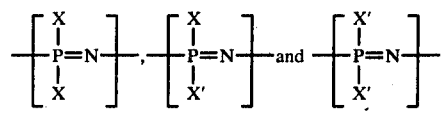

wherein X is —$CNO_2R_1R_2$ in which $R_1$ and $R_2$ are H, a branched, straight chain or cyclic alkyl group containing from 1 to 12 carbon atoms or mixtures thereof, and wherein X' is selected from the group consisting of substituted and unsubstituted alkoxy, alkenyloxy, aryloxy, alkenylaryloxy, amino and mercapto groups or mixtures thereof.

In the copolymer units represented by the above formulas, all X substituent groups may be the same or they may be mixed and all X' substituent groups may be the same or mixed. In the mixtures, the X substituent groups may be mixtures of different —$CNO_2R_1R_2$ groups and the X' substituent groups may be mixtures of alkoxy, alkenyloxy, aryloxy, alkenylaryloxy, amino and mercapto groups.

The copolymers of the invention can be utilized to form protective films and may also be utilized in applications such as for moldings, coatings, and the like.

10 Claims, No Drawings

POLYPHOSPHAZENE COPOLYMERS CONTAINING NITROALKYL SUBSTITUENTS

BACKGROUND OF THE INVENTION

This invention relates to polyphosphazene copolymers containing repeating

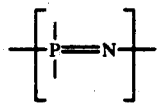

units in the polymer chain in which nitroalkyl substituents and substituted and unsubstituted alkoxy, alkenyloxy, alkenylaryloxy, aryloxy amino and mercapto substituents are attached to the phosphorus atom. More particularly, the invention relates to polyphosphazene copolymers containing substituents derived from nitroalkanes and substituted and unsubstituted aliphatic and aromatic and aromatic alcohols, amino compounds and mercaptan compounds.

Polyphosphazene polymers containing repeating

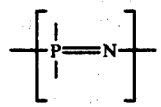

units in which various alkoxy, substituted alkoxy, aryloxy and substituted aryloxy groups are attached to the phosphorus atom and their method of preparation are described in the prior art as illustrated in the publication "Nitrogen-Phosphorus Compounds," Academic Press, New York, N.Y. 1972 by H. R. Allcock and "Poly(Organophosphazenes)," Chemtech, Sept. 19, 1975 by H. R. Allcock and in such U.S. Pat. Nos. as 3,515,688; 3,702,833; and 3,856,712.

However, none of the aforementioned publications and patents or for that matter, none of the prior art of which applications are aware, discloses or suggests polyphosphazene copolymers containing nitroalkyl substituents attached to the phosphorus atom or methods of preparing such copolymers.

SUMMARY OF THE INVENTION

In accordance with this invention, novel polyphosphazene copolymers containing nitroalkyl and substituted or unsubstituted alkoxy, alkenyloxy, alkenylaryloxy, aryloxy, amino or mercapto substituents are prepared.

The copolymers of the invention contain repeating units represented by the formulas:

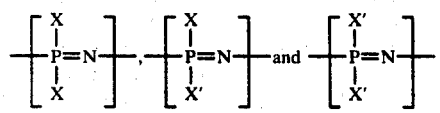

wherein X is $-CNO_2R_1R_2$, in which $R_1$ and $R_2$ are H, a branched, straight chain or cyclic alkyl radical containing 1 to 12 atoms, X' is selected from the group consisting of substituted and unsubstituted alkoxy, alkenyloxy, alkenylaryloxy, aryloxy, amino and mercapto radicals; and the polymer can contain from 20 to 50,000 of such units.

In the copolymer units represented by the above formulas, all X substituent groups may be the same or they may be mixed and all X' substituent groups may be the same or mixed. In the mixtures, the X substituent groups may be mixtures of different $-CNO_2R_1R_2$ groups and the X' substituent groups may be mixtures of alkoxy, aryloxy, alkenyloxy, alkenylaryloxy, amino and mercapto groups or mixtures within each group.

The copolymers are prepared by reacting a poly(dichlorophosphazene) having the formula $-(NPCl_2)_{\overline{n}}$, in which n is from 20 to 50,000, with a mixture of an active nitroalkane and a substituted or unsubstituted aliphatic or aromatic alcohol, an amino compound or a mercaptan compound in the presence of a tertiary amine.

The polymers can be used to prepare films and may be utilized in applications such as molding and coatings.

The specific proportion of X to X' substituent groups incorporated in the copolymers of the invention may vary considerably depending upon chemical and physical properties desired in the copolymer and the particular end use application for which the copolymer is intended. Thus, for applications such as moldings, coatings, foams and the like, the copolymer should contain at least five (5) percent by weight of the X substituent.

DETAILED DESCRIPTION OF THE INVENTION

The term "polymer" as used hereinafter throughout this specification and claims is employed in the broad sense and includes copolymers, terpolymers, tetrapolymers and the like.

As indicated above, the polyphosphazene polymers of this invention are prepared by reacting a poly(dichlorophosphazene) polymer having the structure $-(NPCl_2)_{\overline{n}}$, in which n is from 20 to 50,000 with an alkyl nitro compound and a substituted or unsubstituted aliphatic or aromatic alcohol, an amino compound or a mercaptan compound in the presence of a tertiary amine.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171 and 4,055,520 and the aforementioned publications of H. R. Allcock, the disclosures of which are incorporated herein by reference.

These polymers have the general formula $-(NPCl_2)_{\overline{n}}$, in which n may range from 20 to 50,000 or more. As described in the aforementioned references, the polymers are in general prepared by the thermal polymerization of cyclic oligomers having the formula $-(NPCl_2)_{\overline{n}}$, in which n is an integer of from 3 to 7, with the cyclic trimer and tetramer often comprising up to 90% of the oligomers.

The specific conditions of temperature, pressure and time employed in the thermal polymerization of the cyclic oligomers can vary considerably depending on whether or not the polymerization is catalyzed. Thus, temperatures may range from about 130° C. to about 300° C., pressures may range from a vacuum of less than about $10^{-1}$ Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. SUBSTITUENTS

The nitroalkanes which may be employed in forming the copolymers of the invention are the nitroalkanes of the general formula $O_2NCHR_1R_2$ where $R_1$ and $R_2$ may be H, a branched, straight chain or cyclic alkyl radical with from 1 to 12 carbon atoms. $R_1$ and $R_2$ may vary from site to another in the alkane or may be identical at each site. Illustrative examples of the nitroalkanes which may be suitably employed are 2-nitropropane, nitromethane, alpha nitrotoluene, 3-nitropentane, 2-nitrobutane and the like.

As indicated heretofore, the polyphosphazene copolymers of the invention in addition to the nitroalkyl substituent group may contain substituted or unsubstituted alkoxy, alkenyloxy, aryloxy, alkenylaryloxy, amino or mercapto groups.

Substituent groups represented by X' for use in these copolymers are:

The alkoxy groups (substituted or unsubstituted) may be derived from aliphatic alcohols having from 1 to 20 carbon atoms such as methanol, ethanol, propanol, isopropanol, n-butanol, sec-butanol, hexane, dodecanol and the like; fluoroalcohols, especially those represented by the formula $Z(CF_2)_nCH_2OH$ in which Z is hydrogen or fluorine and n is an integer from 1 to 10 as illustrated by trifluoroethanol, 2,2,3,3,3-pentafluoropropanol, 2,2,3,3,4,4,4-heptafluorobutanol, 2,2,3,3-tetrafluoropropanol, 2,2,3,3,4,4,5,5,-octafluoropentanol, 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

The alkenyloxy groups (i.e., oxy radicals of alkenyl compounds) may be derived from unsaturated aliphatic alcohols such as allyl alcohol, 3-butene-1-ol, 2,3,3,-fluoropropen-1-ol and the like.

The aryloxy groups (substituted or unsubstituted) may be derived from aromatic alcohols including among others phenol; alkylphenols such as cresols, xylenols, p-, o-, and m- ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

The alkenylaryloxy (i.e., alkenyl-substituted aryloxy) group may be derived from unsaturated aromatic alcohols such as vinylphenols, allylphenols, eugenol, isoeugenol and the like.

The amino groups may be derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. Nos. 4,042,561, incorporated herein by reference, as illustrated by aniline, halogen-substituted anilines, alkyl-substituted anilines, alkoxy-substituted anilines and the like.

The mercapto groups may be derived from any of the mercaptan compounds heretofore employed in the polyphosphazene polymer art. Thus, for example, the mercaptan compounds described in U.S. Pat. No. 3,974,242 to Lanier et al, incorporated herein by reference, may be utilized. Representative of suitable mercaptan compounds as described in the aforementioned patent are methyl mercaptan and its homologs ethyl, propyl, butyl, aryl and hexyl mercaptans, thiophenol, thionaphthols, benzyl mercaptan, cyclohexyl mercaptan and the like. Preferred substituent groups represented by X' are alkoxy, especially fluoroalkoxy, and aryloxy, especially substituted phenols.

III. THE TERTIARY AMINE

The use of the tertiary amine minimizes undesirable side reactions and at the same time acts as an effective acid scavenger.

Tertiary amines which may be employed in preparing the polymers of the invention are those represented by the general structure:

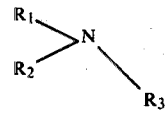

wherein $R_1$, $R_2$, and $R_3$ may each be alkyl containing from 1 to 8 carbon atoms. Thus, for example, the tertiary amine may be a trialkyl amine such as trimethylamine, triethylamine, tri-isopropylamine, tri-n-propylamine, tri-isobutylamine, tri-n-butylamine, and the like. In addition, tertiary amines such as pyridine, N,N,N',N'-tetramethylethylene diamine (TMEDA), dipipyridyl ethane, 1,4 diaza bicyclo (2.2.2) octane (DABCO), N-methyl pyrolle and N-methyl morpholine can also be utilized.

The preferred tertiary amines for use in preparing the polymers of the invention are triethylamine, N,N,N',N'-tetramethylethylene diamine and pyridine.

As indicated above, the copolymers of the present invention are prepared by reacting the poly(dichlorophosphazene) polymer and a mixture of a nitroalkane and a substituted or unsubstituted aliphatic or aromatic alcohol, amino compounds and mercaptan compounds in the presence of a tertiary amine.

The specific reaction conditions and proportion of ingredients employed in preparing these copolymers can vary somewhat depending on factors such as the reactivity of the specific substituent mixture utilized, the particular tertiary amine employed, and the degree of substitution desired in the finished polymer. In general, reaction temperatures may range from about 25° C. to about 200° C. and times may range from 3 hours up to 7 days; lower temperatures necessitating longer reaction times and higher temperatures allowing shorter reaction times. These conditions are, of course, utilized in order to obtain the most complete reaction possible, i.e., in order to insure substantially complete conversion of the chlorine atoms in the polymer to the corresponding ester of the substituent mixture.

The above reaction is ordinarily carried out in the presence of a solvent. The solvent employed in the reaction should be a solvent for both the poly(dichlorophosphazene) polymer, the substituent mixture and the tertiary amine.

In addition, the materials in the reaction zone should be reasonably free of water, most preferably containing 0.01 percent by weight of water or less. The prevention of water in the reaction system is necessary in order to inhibit the reaction of the available chlorine atoms in the chloropolymer therewith. Examples of suitable solvents which may be employed include diglyme, triglyme, tetraglyme, toluene, xylene, cyclohexane, chloroform, dioxane, dioxalene, methylene chloride, tetrachloroethane, and tetrahydrofuran. The amount of solvent employed is not critical and any amount sufficient to solubilize the reaction mixture materials can be employed.

In general, the amount of the substituent mixture employed in the process should be at least molecularly equivalent to the number of available chlorine atoms in the polymer mixture. However, if desired, an excess of such compounds may be employed in order to insure substantially complete reaction of all the available chlorine atoms.

The following examples are submitted for the purpose of further illustrating the nature of the present invention and is not intended as a limitation on the scope thereof. Parts and percentages referred to in the example are by weight unless otherwise indicated.

EXAMPLE I

Preparation of $\mathrm{+P=N+}_n$ Copolymer

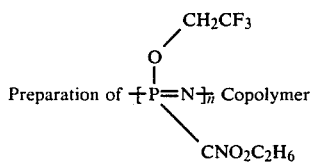

To a 10 ounce beverage bottle was charged 4.0 cc (44 millimoles) of 2-nitropropane, $C_3H_7NO_2$, 100 cc of dry tetrahydrofuran (hereinafter THF), 12.3 cc (88 millimoles) of triethylamine, 3.2 cc (44 millimoles) of trifluoroethanol, and 52.5 gms. of a 8.83% THF solution of poly(dichlorophosphazene) (40.0 millimoles) having a degree of polymerization of about 2600. After 20 hours at 80° C. in a rotary bath and cooling, no PCL bonds could be detected by Infrared spectroscopy.

Coagulation in hexane yielded 5.4 gms. of a tan powder.

An analysis of the polymeric product showed the following results:

C, 19.75%; H, 3.97%, N, 11.72%; P, 18.64%; Cl, 2.42%.

From this a composition of 9.3% triethylamine hydrochlorate, 26.8% hydrolyzed chloropolymer, 42.8% trifluoro derivative and 19.1% of the 2-nitropropane derivative was calculated with the corresponding results:

C, 19.65%; H, 3.56%; N, 11.83%; P, 18.63%; Cl, 2.47%.

The solid polymer when pressed at 175° C. under a pressure of 2000 psi formed a smooth, clear continuous film.

EXAMPLE II

Preparation of $\mathrm{+P=N+}_n$ Copolymer

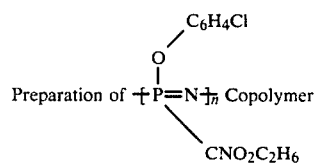

To a 10 ounce beverage bottle was charged 4.0 cc (44 millimoles) of 2-nitropropane, $C_3H_7NO_2$, 100 cc of dry, alcohol free chloroform, 12.3 cc (88 millimoles) of triethylamine, 5.66 gms. (44 millimoles) of p-chlorophenol, and 55.6 gms. of a 8.35% cyclohexane solution of poly(dichlorophosphazene) (40.1 millimoles) having a degree of polymerization of about 2600. After 20 hours at 120° C. in an oven, a black viscous solution with some triethylammonium chloride crystals was obtained. Infrared spectroscopy showed no PCL bond at 600 cm$^{-1}$ and a new bond at 528 cm$^{-1}$.

Water extraction of the salt and then coagulation in methanol and drying gave 9.1 gms. of a black rubber.

We claim:

1. A polyphosphazene copolymer containing randomly distributed units represented by the formulas:

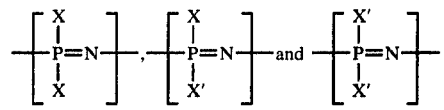

wherein X is $-CNO_2R_1R_2$ in which $R_1$ and $R_2$ are selected from the group consisting of H, a branched, straight chain and cyclic alkyl group containing from 1 to 12 carbon atoms or mixtures thereof, and where X' is selected from the group consisting of substituted and unsubstituted alkoxy, alkenyloxy, aryloxy alkenylaryloxy, amino and mercapto groups or mixtures thereof.

2. The copolymer of claim 1 wherein $R_1$ and $R_2$ are identical.

3. The copolymer of claim 1 wherein the $R_1$ and $R_2$ are dissimilar.

4. The copolymer of claim 1 wherein the X substituent is $-CNO_2C_2H_6$ and the X' substituent is $-OCH_2CF_3$.

5. The copolymer of claim 1 wherein the X substituent is $-CNO_2C_2H_6$ and the X' substituent is $-OC_6H_4Cl$.

6. A method of preparing polyphosphazene copolymers containing randomly distributed units represented by the formulas:

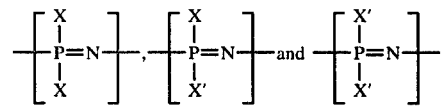

wherein X is $-CNO_2R_1R_2$ in which $R_1$ and $R_2$ are selected from the group consisting of H, a branched, straight chain and cyclic alkyl radical containing from 1 to 12 carbon atoms or mixtures thereof, and wherein X' is selected from the group consisting of substituted and unsubstituted alkoxy, alkenyloxy, aryloxy, alkenylaryloxy, amino and mercapto groups or mixtures thereof; said method comprising reacting a poly(dichlorophosphazene) polymer having the formula $-(NPCl_2)_{\overline{n}}$-, wherein n is from 20 to 50,000, with a mixture consisting of a nitroalkane and a group consisting of a substituted or unsubstituted aliphatic or aromatic alcohol, an amino compound and a mercaptan compound in the presence of a tertiary amine.

7. The method of claim 6 wherein said nitroalkane is 2-nitropropane.

8. The method of claim 6 wherein said mixture consists of 2-nitropropane and trifluoroethanol.

9. The method of claim 6 wherein said mixture consists of 2-nitropropane and p-chlorophenol.

10. The method of claim 6 wherein said tertiary amine is triethylamine.

* * * * *